J. W. NICHOLSON AND C. FOWLER.
WEED DESTROYER AND GROUND STERILIZER.
APPLICATION FILED MAY 27, 1919.
1,337,562.
Patented Apr. 20, 1920.
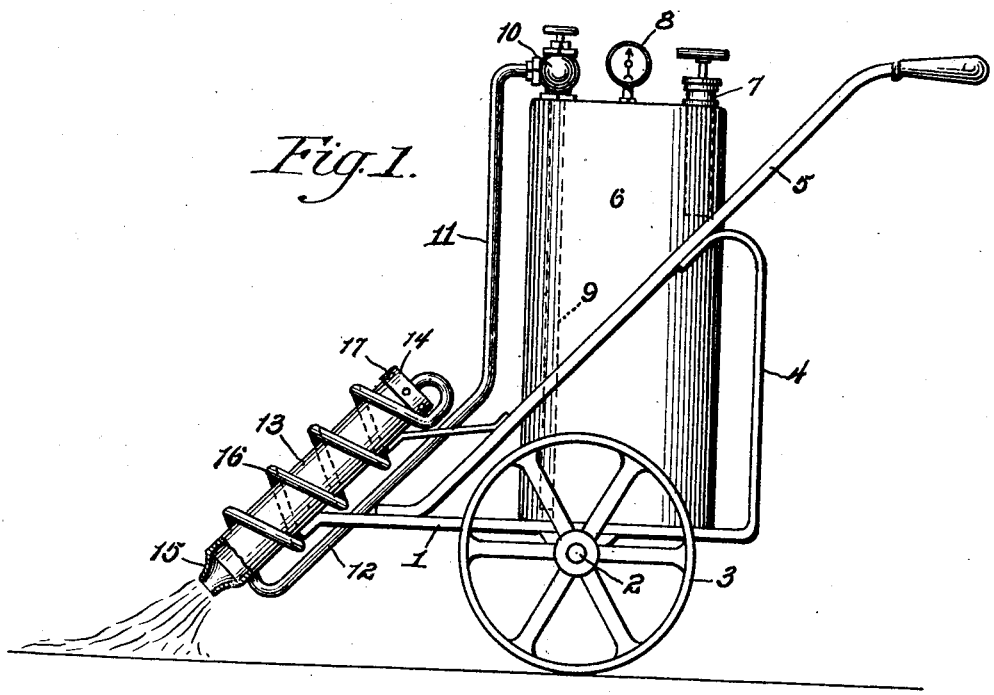
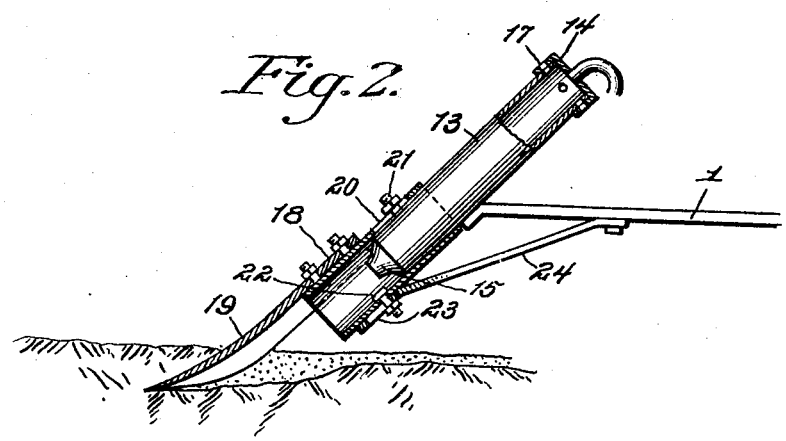
WITNESSES:
L. R. Heinrichs
Marian E. Eisenstein
INVENTORS
John W. Nicholson
Charles Fowler
ATTORNEY.

UNITED STATES PATENT OFFICE.

JOHN WEBSTER NICHOLSON, OF PASADENA, CALIFORNIA, AND CHARLES FOWLER, OF TOMKINS COVE, NEW YORK; SAID FOWLER ASSIGNOR TO SAID NICHOLSON.

WEED-DESTROYER AND GROUND-STERILIZER.

1,337,562. Specification of Letters Patent. Patented Apr. 20, 1920.

Application filed May 27, 1919. Serial No. 300,058.

*To all whom it may concern:*

Be it known that we, JOHN W. NICHOLSON and CHARLES FOWLER, respectively a subject of the King of Great Britain and a citizen of the United States, residing, respectively, at Pasadena, in the county of Los Angeles and State of California, and Tomkins Cove, in the county of Rockland and State of New York, have invented new and useful Improvements in Weed-Destroyers and Ground-Sterilizers, of which the following is a specification.

This invention relates to a device for destroying weeds and other noxious plants or surface refuse; also for destroying worms, insects or germs existing in the ground and which are injurious to useful growing plants.

One object of the invention is to provide a simple, compact and inexpensive construction of portable weed destroyer which will operate to project flames from a volatile fuel against the noxious plants for the purpose of rapidly and efficiently consuming the same.

Another object is to provide an attachment for such a device whereby it may be used to furrow the ground and project the flames into the furrows for destroying plant parasites and thereby sterilizing the soil.

The invention consists of the features of construction, combination and arrangement of parts hereinafter fully described and claimed, reference being had to the accompanying drawing, in which:—

Figure 1 is a side elevation of the device with the sterilizing attachment removed.

Fig. 2 is a vertical longitudinal section through the torch thereof, with the sterilizing attachment applied.

In carrying the invention into practice, we provide a suitable portable frame including a horizontal bar or platform 1 supporting an axle 2 carrying one or more ground wheels 3. The frame also includes one or more rear uprights 4 to which are attached downwardly and forwardly inclined stilts or handles 5, said handles being secured to the upper ends of the uprights 4 and forward portion of the bar or platform 1, thus forming arched parts of the frame structure.

Mounted upon the bar or platform 1 is a tank 6 containing gasolene or other volatile hydrocarbon. The tank 6 is provided with an air pump 7 for supplying air to the interior of the tank to place the gasolene under a desired feeding pressure. A gage 8 is also provided for indicating the pressure within the tank. Extending vertically within the tank is a supply pipe 9 communicating at its upper end through a valve 10 with a feed pipe 11.

The pipe 11 extends downwardly in front of the tank with its upper portion parallel therewith, and has its lower portion projecting downwardly and forwardly at an angle beneath a flame torch 13. This torch 13 comprises a tube or cylinder provided at its upper end with a head or cap 14 and having its lower end reduced to form a discharge nozzle 15, arranged in close proximity to the surface of the ground.

The lower end of the inclined portion 12 of the feed pipe 11 terminates adjacent to the nozzle 15 and connects with the lower end of a vaporizing coil 16. This coil embraces the torch tube 13 and communicates at its upper end through the cap 14 with the upper end of the tube. Registering perforations or openings 17 are provided in the cap 14 and upper end of the torch tube for the admission to the tube of air to combine with the gasolene vapor and form a combustible mixture.

In the use of the device, it will be understood that it is pushed or trundled along the surface of the ground after the flame generator and projector has been set into action. It will be understood that in setting this generator into action the valve 10 is opened to allow gasolene to flow through the pipe 11 to the coil 16 and tube 13 which are initially heated in any suitable manner to a temperature sufficient to vaporize the gasolene. The vapor will then flow through the coil into the torch tube and commingle with the air, the combustible mixture thus produced being ignited in the manner of a Bunsen burner at the nozzle 15, the resulting flames being projected against the surface of the ground, so that in the movement of the device along the ground all weeds and other noxious vegetation will be entirely consumed and destroyed.

After the generator has been set into action, it will be understood that the intense heat of the flames from the torch nozzle, as well as the heated air flowing upwardly along the torch tube and between the generator coils 16, will continuously heat said tube and coils to constantly vaporize the gasolene as long as the device is kept in action. It will be evident that this operation will be efficiently performed, owing to the fact that the parts described lie within the path of the upwardly and rearwardly flowing currents of hot air, and that the coil 16 closely surrounds the burner in a compact manner and is also heated therefrom. Hence at all times the burner or torch tube and coil will be heated sufficiently to volatilize the gasolene to form a perfect combustible mixture. The flames projected by the torch are of such volume and intensity that all growing vegetation along the path of travel of the implement will be rapidly and thoroughly destroyed.

In connection with the device we provide an attachment which may be mounted upon the torch to adapt the device for use as a ground sterilizer. To this end, an extension tube 18 is provided to fit upon and project beyond the nozzle 15 so that the flames from the nozzle may be guided directly into a furrow formed in the ground. This extension tube carries a plow or shovel 19 for opening up the ground and forming a furrow in advance thereof. The tube 18 may be secured in position in any suitable manner. In the present instance it is shown provided in its upper side with a slot 20 to receive a clamping nut and bolt 21 on the torch tube, and said extension tube is also shown as carrying at its lower end a bolt and nut 22 to engage the slotted downturned end 23 of a brace 24 fixed to the frame bar or platform 1, whereby the generator and extension tube will be braced against the pressure of the plow or shovel 19, the fastening construction described permitting of the adjustment of the extension tube to vary its position with relation to the ground and the depth of penetration of the shovel 19. The attachment may be employed whenever it is desired to open up the ground for the exposure of worms, insects and germs injurious to useful vegetation, and projecting the flames beneath the soil into furrows for the purpose of destroying such parasites and thereby thoroughly sterilizing the soil. The device may be employed for use with or without the extension tube, as will be readily understood.

Having thus fully described our invention, we claim:—

1. A device of the character described comprising a wheeled frame, a torch tube supported by the wheeled frame, said tube being arranged at a downward and forward angle of inclination and having a discharge nozzle at its forward end, a supply tank supported upon the frame for holding a volatile fuel, a feed pipe communicating therewith and extending downwardly alongside the torch tube, and a vaporizing coil surrounding the torch tube and connected at one end with said feed pipe and at its opposite end with the rear end of said tube.

2. A device of the character described comprising a wheeled frame, a receptacle for containing a volatile hydrocarbon mounted upon the frame, a torch tube supported at a downward and forward angle of inclination upon the forward portion of the frame, said tube being provided with air inlets at its upper end and having a flame nozzle at its lower end, a feed pipe communicating with the tank and having a portion depending vertically in parallel relation thereto and a portion extending at a downward and forward angle of inclination beneath the torch tube, and a vaporizing coil surrounding said torch tube and communicating at one end with the inclined portion of the feed pipe and at its opposite end with the upper end of said tube.

3. A device of the character described comprising a wheeled frame, a fuel tank mounted upon the frame, a torch tube mounted upon the frame, a feed pipe, a vaporizing coil connected with the feed pipe and torch tube, an extension tube adapted to be detachably mounted upon the torch tube, and a plow or shovel carried by the extension tube for opening up the earth in advance of the torch tube.

4. A device of the character described comprising a wheeled frame, a fuel tank mounted upon the frame, a torch tube mounted upon the frame, a feed pipe, a vaporizing coil connected with the feed pipe and torch tube, an extension tube adjustably mounted upon the torch tube, and a plow or shovel carried by the extension tube for opening up the earth in advance of the torch tube.

In testimony whereof we affix our signatures.

JOHN WEBSTER NICHOLSON.
CHARLES FOWLER.